United States Patent
Ito et al.

(10) Patent No.: US 12,496,643 B2
(45) Date of Patent: Dec. 16, 2025

(54) ROTARY CUTTING METHOD

(71) Applicant: SUBARU CORPORATION, Tokyo (JP)

(72) Inventors: Kinue Ito, Tokyo (JP); Kenji Murai, Tokyo (JP); Shinichi Yajima, Tokyo (JP); Takashi Sugimoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 418 days.

(21) Appl. No.: 17/734,652

(22) Filed: May 2, 2022

(65) Prior Publication Data
US 2022/0250171 A1 Aug. 11, 2022

Related U.S. Application Data

(63) Continuation of application No. PCT/JP2020/040545, filed on Oct. 29, 2020.

(30) Foreign Application Priority Data

Dec. 16, 2019 (JP) .................................. 2019-226036

(51) Int. Cl.
  *B23C 5/06* (2006.01)
  *B23C 5/20* (2006.01)
  *B23C 5/28* (2006.01)
(52) U.S. Cl.
  CPC ................ *B23C 5/06* (2013.01); *B23C 5/202* (2013.01); *B23C 5/28* (2013.01)

(58) Field of Classification Search
  CPC ..... B23C 3/00; B23C 5/06; B23C 5/28; B23C 5/282; B23C 2210/0428;
  (Continued)

(56) References Cited

U.S. PATENT DOCUMENTS 5,145,295 A  9/1992 Satran
5,190,418 A  3/1993 Nakayama et al.
(Continued)

FOREIGN PATENT DOCUMENTS

CN  102625737 A  8/2012
DE  102008002406 A1 * 12/2009 ............... B23C 3/06
(Continued)

OTHER PUBLICATIONS

Second Office Action issued in the Chinese Patent Application No. 202080083357.4 dated May 28, 2024, with English Translation.
(Continued)

*Primary Examiner* — Sunil K Singh
*Assistant Examiner* — Eric Daniel Whitmire
(74) *Attorney, Agent, or Firm* — Rimon P.C.

(57) ABSTRACT

A rotary cutting method includes producing a processed product by rotary cutting of a workpiece by a rotary tool. The rotary tool has at least one cutting edge of which both of a first rake angle in a rotation radial direction and a second rake angle in a rotation axis direction are negative. The at least one cutting edge has a slanted face connected with a rake face forming the first and second rake angles. The slanted face is connected with the rake face at a ridge line. The slanted face faces a rotating direction of the rotary tool. An angle of the slanted face to the rotation axis direction is positive.

3 Claims, 12 Drawing Sheets

(58) Field of Classification Search
CPC .... B23C 2210/0435; B23C 2210/0421; B23C 2220/28; B23C 2222/04; B23C 2222/14; B23C 2222/88
See application file for complete search history.

(56) References Cited

U.S. PATENT DOCUMENTS

| | | | |
|---|---|---|---|
| 5,207,538 | A | 5/1993 | Satran |
| 5,593,255 | A | 1/1997 | Satran et al. |
| 6,196,770 | B1 | 3/2001 | Astrom et al. |
| 6,669,412 | B1 | 12/2003 | Hirose et al. |
| 8,715,838 | B2 | 5/2014 | Okada et al. |
| 2003/0170079 | A1 | 9/2003 | Daiguji et al. |
| 2004/0081520 | A1 | 4/2004 | Ishii et al. |
| 2008/0304924 | A1 | 12/2008 | Engstrom et al. |
| 2009/0311057 | A1 | 12/2009 | Yoshida et al. |
| 2014/0334890 | A1 | 11/2014 | Takahashi |
| 2019/0210124 | A1 | 7/2019 | Slusarck et al. |
| 2020/0254529 | A1 | 8/2020 | Kiuchi et al. |
| 2021/0178498 | A1 | 6/2021 | Ito et al. |
| 2021/0276102 | A1* | 9/2021 | Sadik ................. B23Q 11/1053 |
| 2021/0362250 | A1* | 11/2021 | Andersson ............. B23C 5/202 |

FOREIGN PATENT DOCUMENTS

| | | |
|---|---|---|
| EP | 0489702 A2 | 6/1992 |
| EP | 0506098 A1 | 9/1992 |
| EP | 3378589 A1 | 9/2018 |
| FR | 2789613 A1 | 8/2000 |
| JP | 62-208817 A | 9/1987 |
| JP | 08-323510 A | 12/1996 |
| JP | 10-146712 A | 6/1998 |
| JP | 2002-046002 A | 2/2002 |
| JP | 2003-001512 A | 1/2003 |
| JP | 2003-334716 A | 11/2003 |
| JP | 2005-118960 A | 5/2005 |
| JP | 2006-181702 A | 7/2006 |
| JP | 2007210070 A * | 8/2007 |
| WO | 2013/088851 A1 | 6/2013 |
| WO | 2017/085975 A1 | 5/2017 |

OTHER PUBLICATIONS

U.S. PTO Non-Final Office Action issued in related U.S. Appl. No. 17/109,988, mailed Sep. 22, 2022.
Translation of the International Preliminary Report on Patentability and the Written Opinion of the International Search Authority issued in corresponding International Patent Application No. PCT/JP2020/040545, dated Jun. 30, 2022.
Second Japanese Notice of Reasons for Refusal issued in Japanese Patent Application No. 2019-226036, dated Jul. 11, 2023, with English translation.
Japanese Notice of Reasons for Refusal issued in Japanese Patent Application No. 2019-226036, dated Apr. 5, 2023, with English translation.
Extended European Search Report issued in corresponding European Patent Application No. 20904009.6, dated Dec. 6, 2023.
First Office Action issued in the Chinese Patent Application No. 202080083357.4 dated Jan. 23, 2024, with English Translation.
International Search Report issued in corresponding International Patent Application No. PCT/JP2020/40545, dated Dec. 22, 2020, with English translation.
Extended European Search Report from co-pending U.S. Appl. No. 20/214,106 issued in corresponding European Patent Application No. 20214106-1017, dated May 20, 2021.
Decision of Refusal dated Sep. 29, 2024, issued in corresponding Chinese Patent Application No. 202080083357.4, 13 pages.
Shun, Yu et al. "Machine Manufacturing Technology", Jilin Educational Publishing House, Jun. 1986, pp. 117-119, English abstract.

* cited by examiner

ROTARY CUTTING METHOD

CROSS REFERENCES TO RELATED APPLICATIONS

This is a continuation of Application PCT/JP2020/40545, filed on Oct. 29, 2020.

This application is based upon and claims the benefit of priority from Japanese Patent Application No. 2019-226036, filed on Dec. 16, 2019; the entire contents of which are incorporated herein by reference.

FIELD

Implementations described herein relate generally to a rotary cutting method.

BACKGROUND

Conventionally, tip replaceable rotary tools, such as a tip replaceable end mill and a tip replaceable milling cutter, for rotary cutting of a workpiece made of an aluminum alloy or the like are known. A tip replaceable rotary tool is used by mounting cutting inserts (also called throw-away tips) on a tool holder.

The tip replaceable rotary tool disclosed by Japanese Patent Application Publication JP 2003-334716 A includes a tool holder, rotated around a holder center axis, and plate-like cutting inserts, detachably mounted on the tip portion of the tool holder. A cutting insert has a front surface, a back surface, an outer peripheral surface connecting the front surface with the back surface, and a cutting edge formed on the intersecting ridgeline between the front surface and the outer peripheral surface. The front surface has a rake face connected with the cutting edge while the outer peripheral surface has a flank connected with the cutting edge.

The rake face and the flank of the cutting insert disclosed by Japanese Patent Application Publication JP 2003-334716 A are each slanted face whose angle is positive.

In addition, tip replaceable rotary tools disclosed by Japanese Patent Application Publication JP 2003-001512 A, Japanese Patent Application Publication JP H8(1996)-323510 A and Japanese Patent Application Publication JP H10(1998)-146712 A respectively are also each known as a tip replaceable rotary tool used with attaching cutting inserts for milling or boring. The cutting edges of the tip replaceable rotary tools disclosed by Japanese Patent Application Publication JP 2003-001512 A, Japanese Patent Application Publication JP H8(1996)-323510 A and Japanese Patent Application Publication JP H10(1998)-146712 A respectively have negative rake angles. However, a tip replaceable rotary tool whose cutting edges have positive rake angles is conventionally used in case of cutting of an aluminum alloy, which is viscous and flexible compared to another metal, in order to secure satisfactory machinability.

Conventionally, when a tip replaceable rotary tool whose cutting edges have positive rake angles is used for cutting, e.g., a plate-like portion whose thickness is about several millimeters and the like of an elongated workpiece made of an aluminum alloy, such as a wing surface part of an aircraft whose length is several meters, the workpiece sometimes bends after the cutting. This is because a workpiece generally has tensile residual stress distributions and compressive residual stress distributions different among portions of material in the thickness direction as the characteristics of the material before cutting, and therefore cutting of the workpiece by a tip replaceable rotary tool whose cutting edges have positive rake angles changes the balance of the distributions of the residual stresses. Specifically, cutting of the workpiece by a tip replaceable rotary tool whose cutting edges have positive rake angles causes moments of force in the workpiece, and thereby warpage arises in the workpiece. When a workpiece is bent and warped, time and labor for processing to correct the warpage is required.

On the other hand, a tip replaceable rotary tool whose cutting edges have negative rake angles performs cutting of material while dividing chips finely so as to allow the cutting even when the material is hard but fragile like cast steel, and therefore using the tool for cutting of a flexible and viscous aluminum alloy causes a problem that chips are not divided and welded to the tool due to processing heat.

An object of the present invention is to allow rotary cutting of a workpiece made of a metal, such as an aluminum alloy, under a more satisfactory condition.

SUMMARY OF THE INVENTION

In general, according to one implementation, a rotary cutting method includes producing a processed product by rotary cutting of a workpiece by a rotary tool. The rotary tool has at least one cutting edge of which both of a first rake angle in a rotation radial direction and a second rake angle in a rotation axis direction are negative.

DETAILED DESCRIPTION

One implementation of the present invention will be described with reference to the drawings.

A tip replaceable rotary tool 10 according to the present implementation is a tip replaceable end mill, a tip replaceable milling cutter or the like, for example. The tip replaceable rotary tool 10 applies rotary cutting, such as face milling, to a workpiece, such as a wing surface part made of an aluminum alloy used for an aircraft, for example. The rotary cutting is performed by rotating a rotary tool, such as a milling cutter or an end mill, and milling is typical rotary cutting.

Concretely, a workpiece is an elongated material whose length is several meters (for example, not less than 3 m), and has at least one plate like portion whose thickness is several millimeters (for example, about 2 mm). The workpiece has pocket portions, and the plate like portion whose thickness is several millimeters lies as a bottom wall of one pocket portion or the like, for example. The tip replaceable rotary tool 10 is suitable for rotary cutting, such as finishing, of the plate like portion of the workpiece in particular. Moreover, the tip replaceable rotary tool 10 has a cutting edge part whose outside diameter is about 25 mm for example, and is suitable for rotary cutting of each pocket portion of the workpiece.

Figure 1:
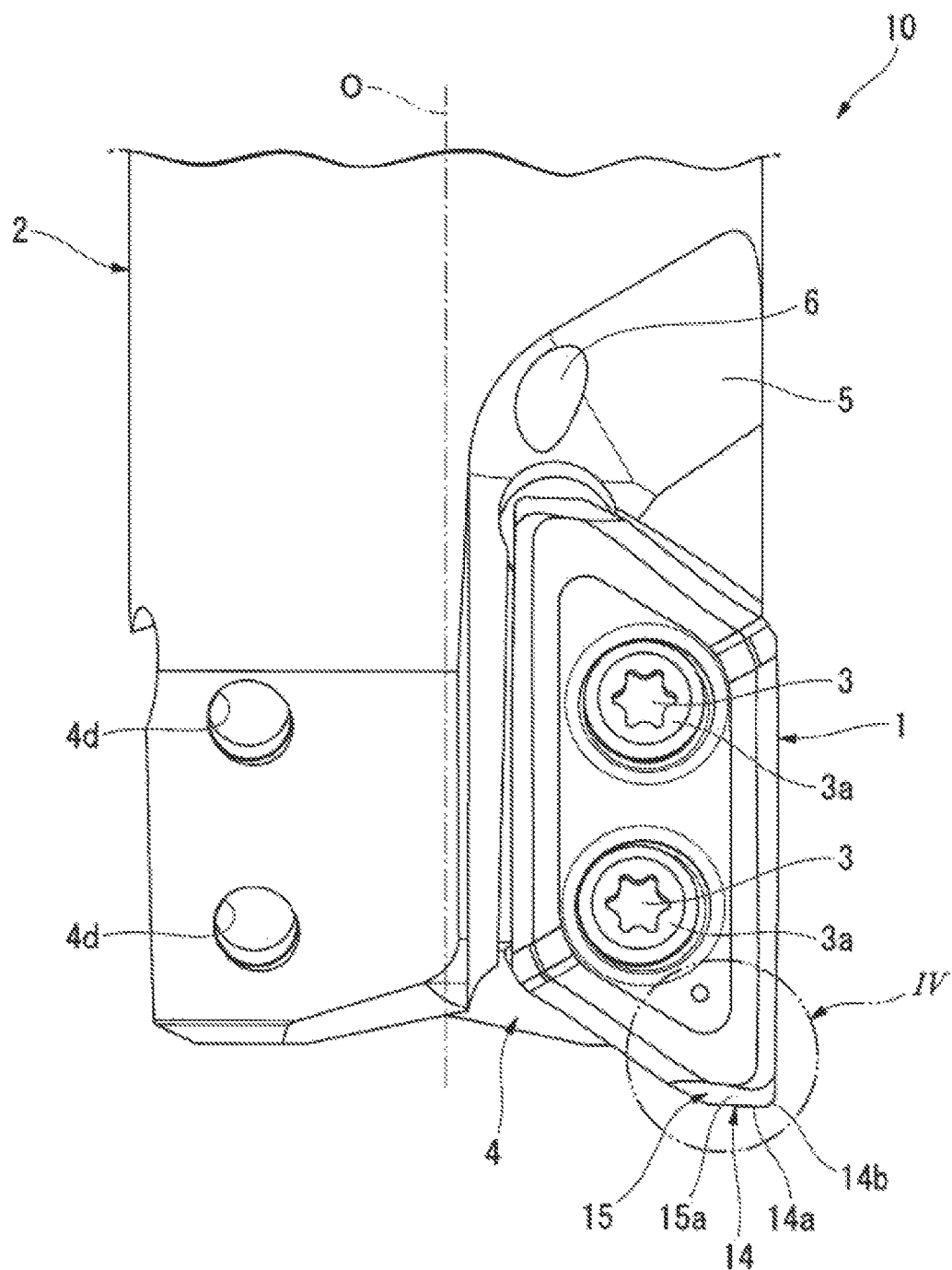
FIG. 1 is a plan view of a part of a tip replaceable rotary tool according to an implementation of the present invention, as viewed from a circumferential direction of a holder toward the front surface of a cutting insert faced to the front side.
Figure 2:
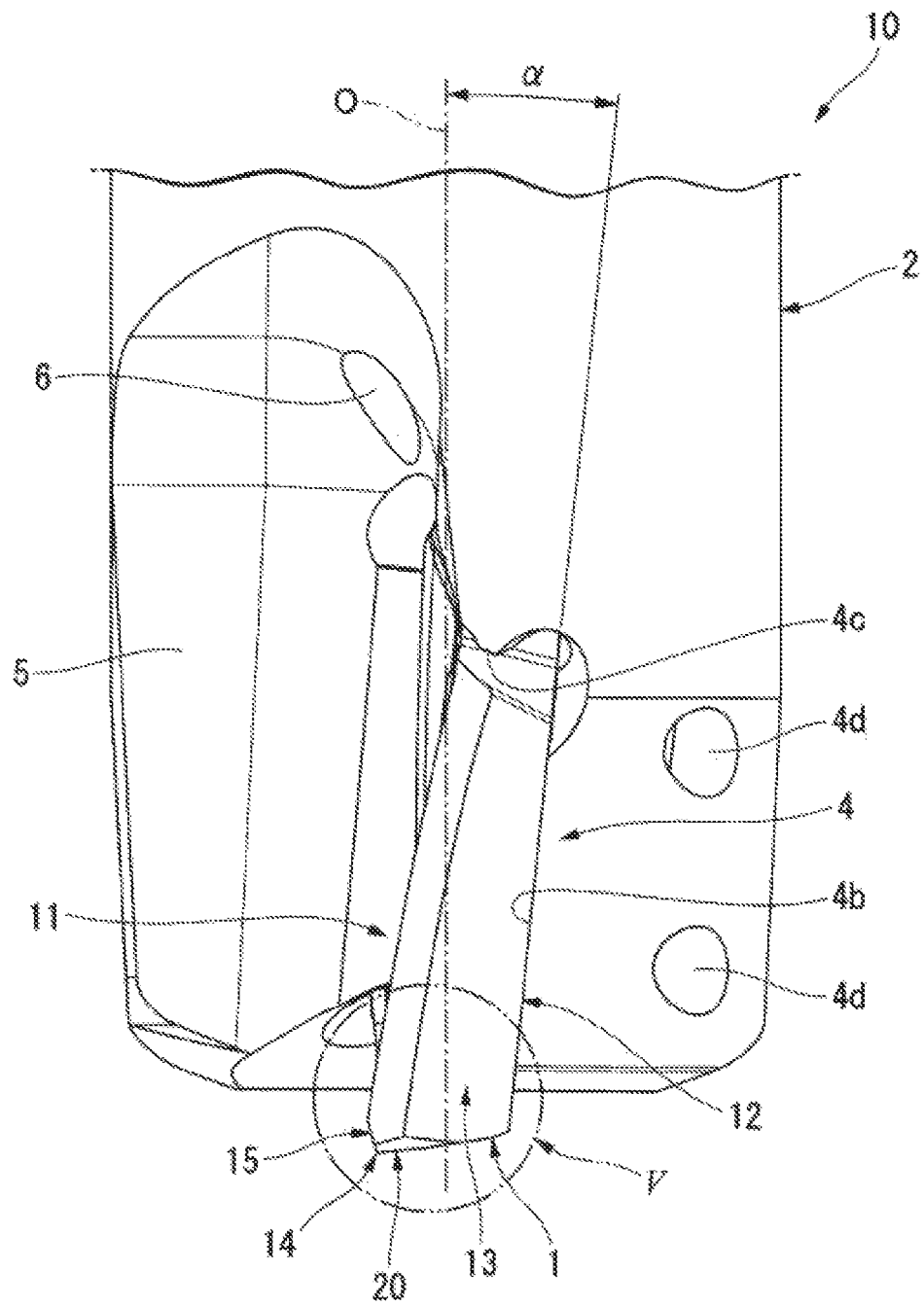
FIG. 2 is a side view of a part of the tip replaceable rotary tool as viewed from the cutting edge length direction of the main cutting edge part of a cutting insert.
Figure 3:
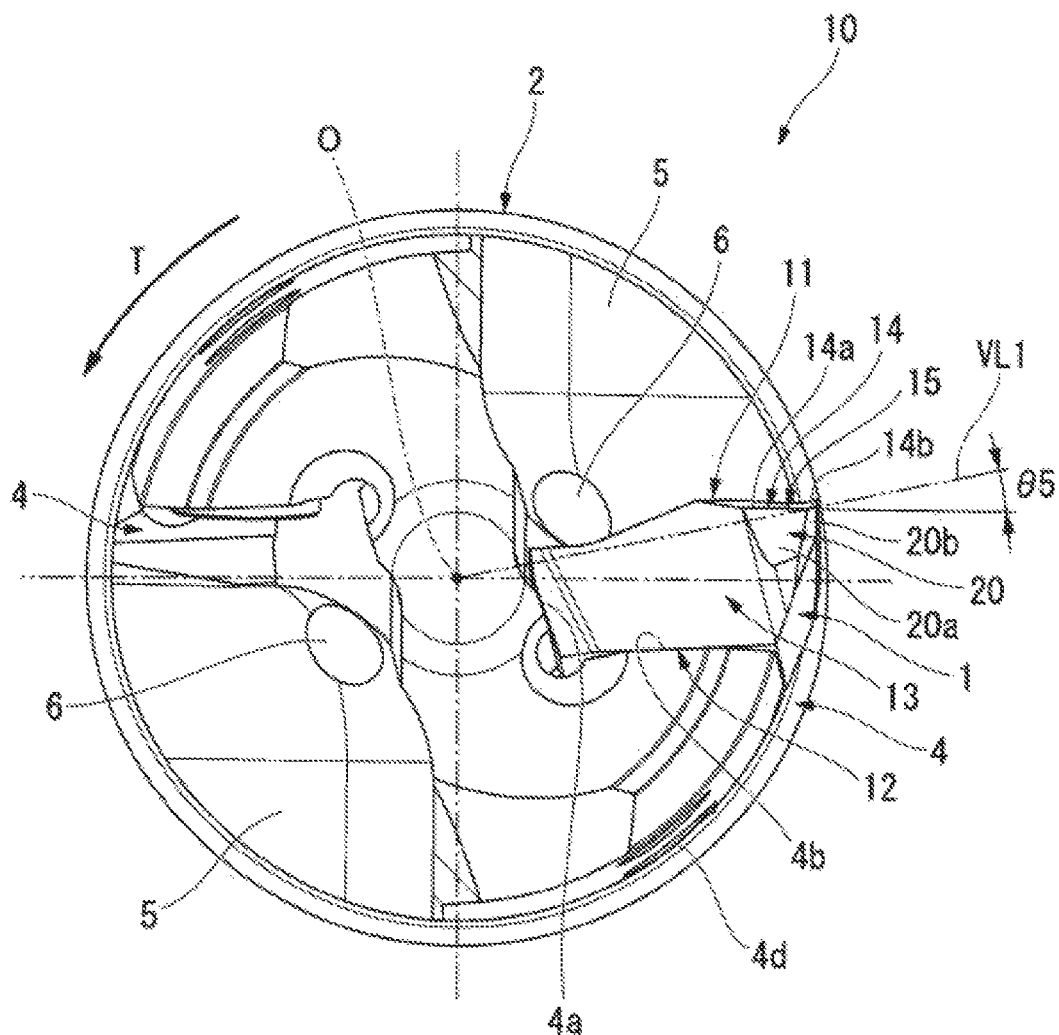
FIG. 3 is a bottom view of the tip replaceable rotary tool as viewed from the holder axis direction.

As shown in FIG. 1 to FIG. 3, the tip replaceable rotary tool 10 includes a tool holder 2, cutting inserts 1 and screw members 3.

The tool holder 2 has a columnar shape or the like around the holder center axis O. The tool holder 2 is detachably mounted on a spindle of a machine tool. The tool holder 2 is rotated around the holder center axis O by a spindle of a machine tool. The first end portion of the tool holder 2, out of both end portions in the holder axis direction in which the holder center axis O extends, is coupled to a spindle of a machine tool while the cutting inserts 1 are disposed on the second end portion of the tool holder 2. The first end portion of the tool holder 2 may be also referred to as a shank part while the second end portion may be also referred to as a cutting edge part.

In the present implementation, the multiple cutting inserts 1 are attached to the tip replaceable rotary tool 10. Each cutting insert 1 is attached to the tool holder 2. Note that, illustration of some of the cutting inserts 1 has been omitted in FIG. 1 to FIG. 3.

As shown in FIG. 6 to FIG. 9, the cutting insert 1 is a plate whose center is the insert center axis C. In the present implementation, the cutting insert 1 is a polygonal plate. The cutting insert 1 has a front surface 11, a back surface 12, an outer peripheral surface 13 and a cutting edge 14. The front surface 11 and the back surface 12 face the insertion axis direction in which the insert center axis C extends. The outer peripheral surface 13 connects the front surface 11 to the back surface 12. The cutting edge 14 is formed on the intersecting ridgeline of the front surface 11 and the outer peripheral surface 13.

As shown in FIG. 1, the screw members 3 fix the cutting inserts 1 to the tool holder 2. The screw members 3 are attached to the tip replaceable rotary tool 10.

Definition of Directions

In the present implementation, the direction in which the holder center axis O of the tool holder 2 extends (the direction along the holder center axis O) is referred to as the holder axis direction. In the holder axis direction, the direction from the first end portion of the tool holder 2 (which is the shank part) to the second end portion (which is the cutting edge part) is referred to as the tip side while the direction from the second end portion to the first end portion is referred to as the rear end side.

A direction orthogonal to the holder center axis O is referred to as the holder diameter direction. In the holder diameter direction, the direction approaching the holder center axis O is referred to as the inside of the holder diameter direction while the direction away from the holder center axis O is referred to as the outside of the holder diameter direction.

The direction revolving around the holder center axis O is referred to as the holder circumferential direction. In the holder circumferential direction, the direction in which the tool holder 2 is rotated during rotary cutting is referred to as the holder rotation direction T while the rotation direction opposite to the above-mentioned direction is referred to as the opposite direction to the holder rotation direction T (anti-holder rotation direction).

Moreover, the direction in which the insert center axis C of the cutting insert 1 extends (the direction along the insert center axis C) is referred to as the insert axis direction. The insert axis direction may be also referred to as the thickness direction of the cutting insert 1. In the insert axis direction, the direction from the front surface 11 of the cutting insert 1 to the back surface 12 is referred to as the back surface 12 side from the front surface 11 while the direction from the back surface 12 to the front surface 11 is referred to as the front surface 11 side from the back surface 12.

A direction orthogonal to the insert center axis C is referred to as the insert diameter direction. In the insert diameter direction, the direction approaching the insert center axis C is referred to as the inside of the insert diameter direction while the direction away from the insert center axis C is referred to as the outside of the insert diameter direction.

The direction revolving around the insert center axis C is referred to as the insert circumferential direction.

Moreover, in the present implementation, the direction in which an after-mentioned main cutting edge part 14a of the cutting edge 14 extends is referred to as the cutting edge length direction.

[Tool Holder]

The tool holder 2 is made of a metal, such as a steel material, for example. The tool holder 2 is columnar or tubular. As shown in FIG. 1 to FIG. 3, in the present implementation, the tool holder 2 is cylindrical columnar or cylindrical tubular. Note that, the tool holder 2 may have a disk shape or the like. The tool holder 2 has insert mounting seats 4, chip pockets 5 and coolant holes 6.

[Insert Mounting Seat]

Each insert mounting seat 4 is disposed on the tip portion of the tool holder 2. The insert mounting seat 4 is recessed from the tip face of the tool holder 2 to the rear end side in the holder axis direction. The insert mounting seat 4 is recessed from the outer peripheral surface of the tool holder 2 to the inside in the holder diameter direction. The insert mounting seat 4 has holes with which the cutting insert 1 can be attached. More specifically, the insert mounting seat 4 is polygonal and has holes. In the present implementation, the insert mounting seat 4 is quadrilateral and has holes. The insert mounting seats 4 are formed on the tool holder 2. The insert mounting seats 4 are disposed on the tip outer peripheral portion of the tool holder 2 with intervals in the holder circumferential direction.

The cutting insert 1 is detachably mounted on the insert mounting seat 4. The cutting insert 1 is mounted on the insert mounting seat 4 such that the cutting edge 14 (the main cutting edge part 14a and a corner cutting edge part 14b each described later) may protrude from the tip end face of the tool holder 2 toward the tip side in the holder axis direction. The cutting insert 1 mounted on the insert mounting seat 4 projects a part of the cutting edge 14 (an outer end part of the main cutting edge part 14a and the corner cutting edge part 14b described later) from the outer peripheral surface of the tool holder 2 toward the outside in the holder diameter direction.

The insert mounting seat 4 has an inner wall surface 4a, a mounting face 4b, an upper wall surface 4c and screw holes 4d.

In the insert mounting seat 4, the inner wall surface 4a faces outward in the holder diameter direction. The inner wall surface 4a is flat. The inner wall surface 4a is quadrilateral, for example. As shown in FIG. 3, the inner wall surface 4a extends inward in the holder diameter direction as the inner wall surface 4a extends toward the holder rotation direction T. When the cutting insert 1 is attached on the insert mounting seat 4, the inner wall surface 4a comes into contact with the outer peripheral surface 13. More specifically, the inner wall surface 4a comes into contact with a portion, facing inward in the holder diameter direction, of the outer peripheral surface 13.

In the insert mounting seat 4, the mounting face 4b faces the holder rotation direction T. The mounting face 4b is flat. The mounting face 4b is polygonal and, for example, is quadrangle. As shown in FIG. 2, the mounting face 4b inclines and extends toward the direction opposite to the holder rotation direction T as the mounting face 4b extends toward the rear end side in the holder axis direction. That is, the mounting face 4b forms a positive inclined face having a positive axial rake angle. More specifically, as shown in FIG. 2, the angle α formed between the holder center axis O and the mounting face 4b is positive as viewed from the cutting edge length direction (of the main cutting edge part 14a described below) of the cutting edge 14. For example, the angle α is more than 0° and not more than 10°. The angle α is smaller than the after-mentioned first angle θ1 of the cutting insert 1. When the cutting insert 1 is attached on the insert mounting seat 4, the mounting face 4b comes into contact with the back surface 12.

In the insert mounting seat 4, the upper wall surface 4c faces the tip side in the holder axis direction. The upper wall surface 4c is flat. For example, the upper wall surface 4c is quadrangle. As shown in FIG. 2, the upper wall surface 4c extends rearward in the holder axis direction as the upper wall surface 4c extends toward the holder rotation direction T. When the cutting insert 1 is attached on the insert mounting seat 4, the upper wall surface 4c comes into contact with the outer peripheral surface 13. More specifically, the upper wall surface 4c comes into contact with a portion, facing rearward in the holder axis direction, of the outer peripheral surface 13.

Each of the screw holes 4d opens in the mounting face 4b. Each of the screw holes 4d extends almost perpendicularly to the mounting face 4b. In the present implementation, each of the screw holes 4d also opens in the outer peripheral surface of the tool holder 2. That is, each of the screw holes 4d is a through hole. Each of the screw holes 4d has a female thread part on the inner peripheral surface of the screw hole 4d. In the present implementation, the multiple screw holes 4d are formed in the insert mounting seat 4. The screw holes 4d are disposed with an interval in the holder axis direction.

[Chip Pocket]

As shown in FIG. 1 to FIG. 3, the chip pockets 5 are disposed at the tip outer peripheral part of the tool holder 2. The multiple chip pockets 5 are formed on the tool holder 2. The chip pockets 5 are disposed with intervals in the holder circumferential direction. The chip pockets 5 are disposed adjacently to the insert mounting seats 4 in the holder rotation direction T, respectively. The chip pockets 5 are respectively connected with the insert mounting seats 4 from the holder rotation direction T.

Each chip pocket 5 is recessed from the tip end face of the tool holder 2 toward the rear end side in the holder axis direction. The length (depth) of the chip pocket 5 recessed from the tip end face of the tool holder 2 toward the rear end side in the holder axis direction is larger than that of the insert mounting seat 4 recessed from the tip end face of the tool holder 2 toward the rear end side in the holder axis direction.

Each chip pocket 5 is recessed from the outer peripheral surface of the tool holder 2 toward the inner side in the holder diameter direction. The length (depth) of the chip pocket 5 recessed from the outer peripheral surface of the tool holder 2 toward the inner side in the holder diameter direction is larger than that of the insert mounting seat 4 recessed from the outer peripheral surface of the tool holder 2 toward the inner side in the holder diameter direction.

[Coolant Hole]

Each of the coolant holes 6 extends inside the tool holder 2. In the present implementation, the coolant holes 6 extend inside the tool holder 2 in the holder axis direction. The coolant holes 6 pass through the tool holder 2. The end portion, on the rear end side in the holder axis direction, of each of the coolant holes 6 is coupled to a coolant supply means, such as a pump, through a flow channel inside the spindle of a machine tool, a pipe and the like. The coolant supply means supplies coolant, such as cutting fluid or compressed air, into each of the coolant holes 6. The end portion, on the tip side in the holder axis direction, of each of the coolant holes 6 opens out to the chip pocket 5. The coolant holes 6 open toward the cutting edges 14 of the cutting inserts 1 mounted on the insert mounting seats 4, parts to be processed of a workpiece, and the like.

[Cutting Insert]

Each of the cutting inserts 1 is made of cemented carbide containing, e.g., tungsten carbide, cobalt and the like as components. As shown in FIG. 6 to FIG. 9, each of the cutting inserts 1 is a plate, and specifically, a polygonal plate. In the present implementation, each of the cutting inserts 1 is a quadrangular plate. A pair of the plate surfaces (the front surface 11 and the back surface 12) of each of the cutting inserts 1 face in the insert axis direction. The cutting insert 1 according to the present implementation is 180° rotationally symmetric about the insert center axis C. The cutting insert 1 is not front-back rotationally symmetric. That is, the cutting insert 1 is front-back rotationally asymmetric. The cutting insert 1 is a single-sided cutting chip.

As shown in FIG. 1 to FIG. 3, the cutting inserts 1 are disposed in the tip portion of the tool holder 2. When the cutting insert 1 is attached to the tool holder 2, the front surface 11 and the back surface 12 of the cutting insert 1 face the holder circumferential direction. That is, the cutting insert 1 according to the present implementation is of a so-called horizontal edge type. When the cutting insert 1 is mounted on the insert mounting seat 4, the insert center axis C of the cutting insert 1 inclines and extends toward the rear end side in the holder axis direction as the insert center axis C extends toward the holder rotation direction T.

The cutting insert 1 has the cutting edge 14, the front surface 11, the back surface 12, the outer peripheral surface 13 and through holes 19. The back surface 12 has a flat shape perpendicular to the insert center axis C. The back surface 12 may be referred to as a reference surface of the cutting insert 1.

[Cutting Edge]

When the cutting insert 1 is attached to the tool holder 2, the cutting edge 14 of the cutting insert 1 protrudes from the tip portion of the tool holder 2 toward the tip side in the holder axis direction. In the present implementation, the multiple cutting edges 14 are formed on the cutting insert 1 as shown in FIG. 6 to FIG. 9. In the illustrated example, the two cutting edges 14 are formed on the cutting insert 1. The cutting edges 14 are disposed with an interval in the insert circumferential direction. In the present implementation, the cutting edges 14 extend along parts of the short edges out of the four sides (that is, a pair of the long sides and a pair of the short sides) constituting the outer peripheral edge of the front surface 11, as viewed from the insert axis direction as shown in FIG. 7.

Each of the cutting edges 14 has the main cutting edge part 14a and the corner cutting edge part 14b.

Figures 9, 10:
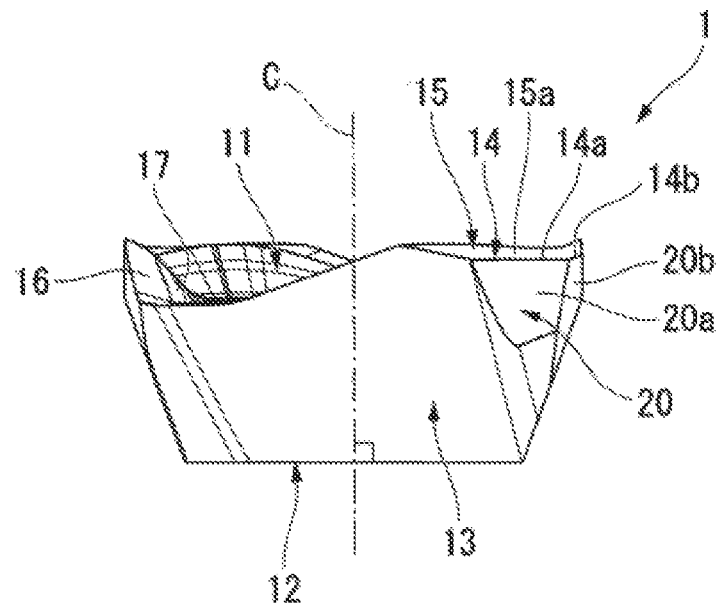
FIG. 9 is a bottom view (top view) of the cutting insert as viewed from a direction, orthogonal to the main cutting edge part, out of the insert diameter directions.
FIG. 10 explains a rotary cutting method of a workpiece using a rotary cutting tool, such as the tip replaceable rotary tool.

In the present implementation, the main cutting edge part 14a is linear. In the present implementation, the main cutting edge part 14a serves as a wipe insert for finishing. As shown in FIG. 9, the main cutting edge part 14a extends almost perpendicularly to the insert center axis C as viewed from the insert diameter direction. In FIG. 9, the main cutting edge part 14a extends almost in parallel to the back surface 12.

As shown in FIG. 3, when the cutting insert 1 is attached to the tool holder 2, the main cutting edge part 14a extends to the direction opposite to the holder rotation direction T as the main cutting edge part 14a extends toward the outside of the holder diameter direction, as viewed from the holder axis direction. The fifth angle θ5 formed between the main cutting edge part 14a and the virtual straight line VL1 passing through the holder center axis O and the outer end in the holder diameter direction of the main cutting edge part 14a is not less than 12° and not more than 30° as viewed from the holder diameter direction. The fifth angle θ5 can be referred to as the radial rake angle of the main cutting edge part 14a. In the present implementation, the radial rake angle of the main cutting edge part 14a is negative.

Figure 4:
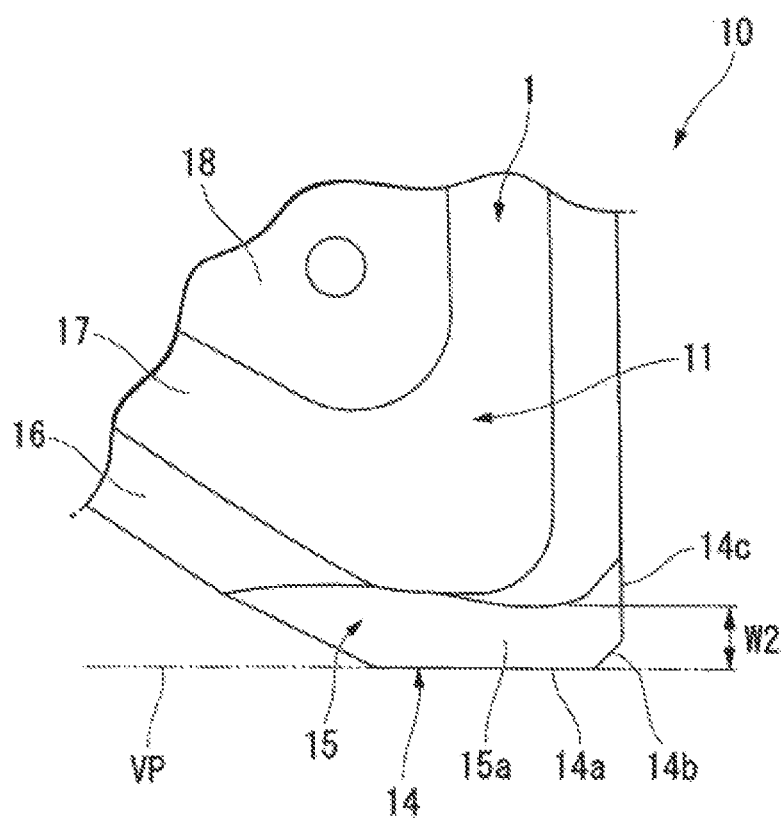
FIG. 4 is an enlarged view of the part IV in FIG. 1.
Figure 5:
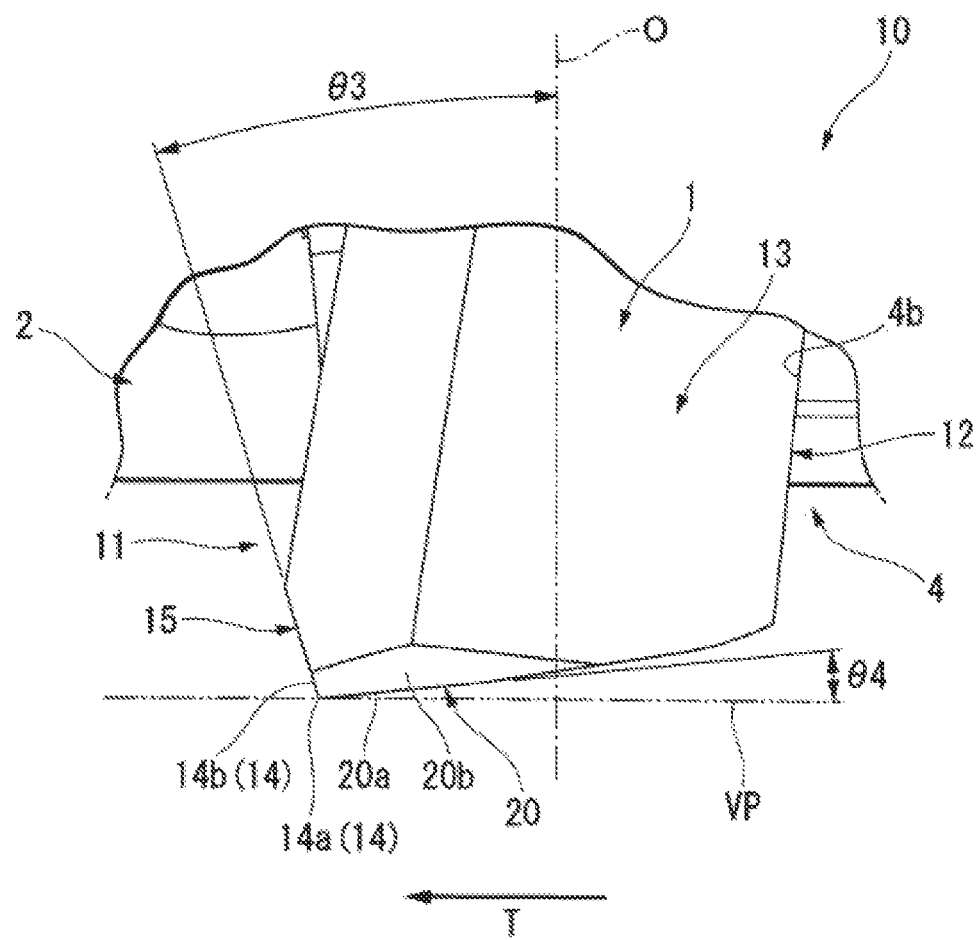
FIG. 5 is an enlarged view of the part V in FIG. 2.
Figure 6:
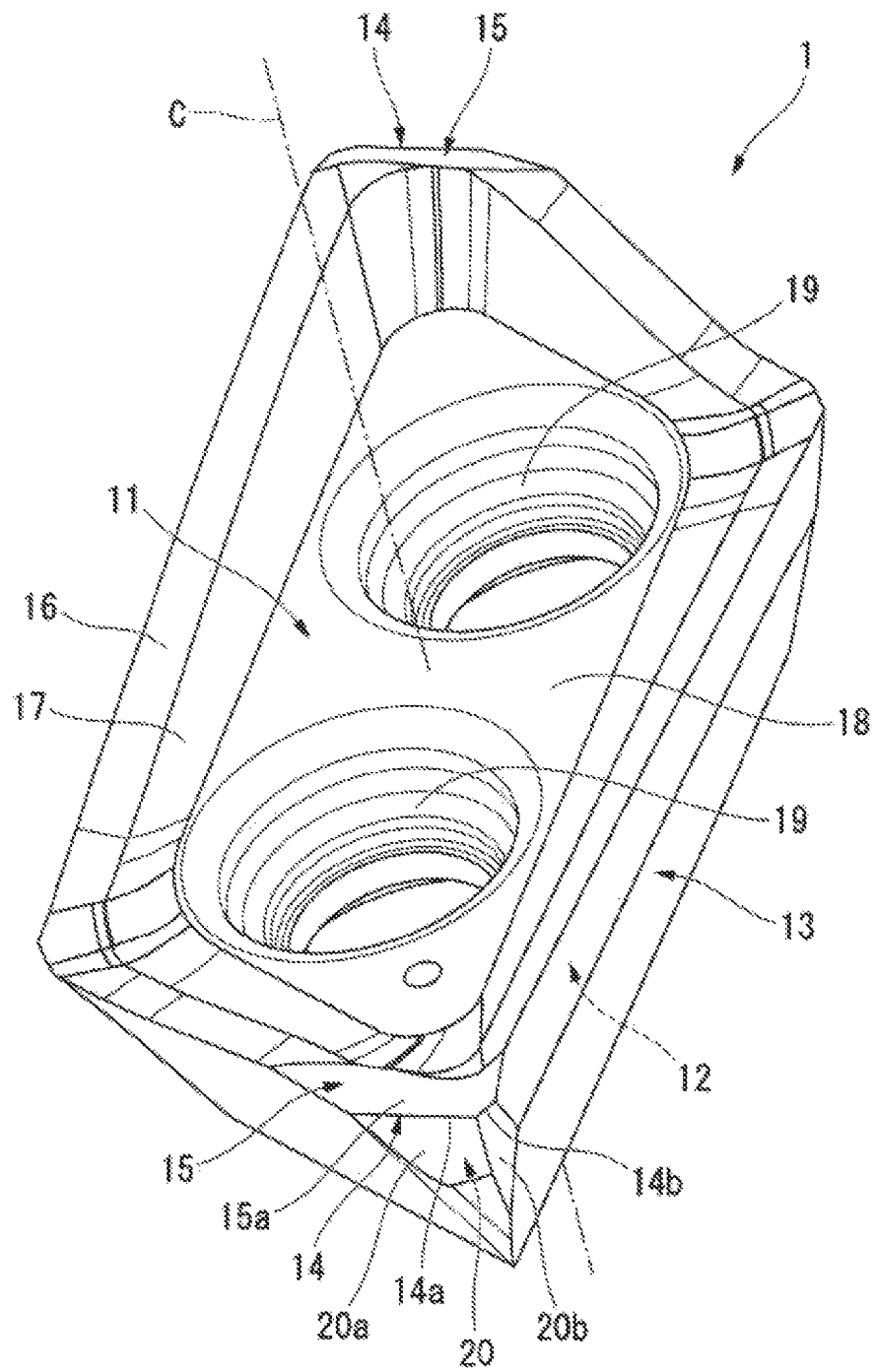
FIG. 6 is a perspective view of the cutting insert according to an implementation of the present invention.
Figure 7:
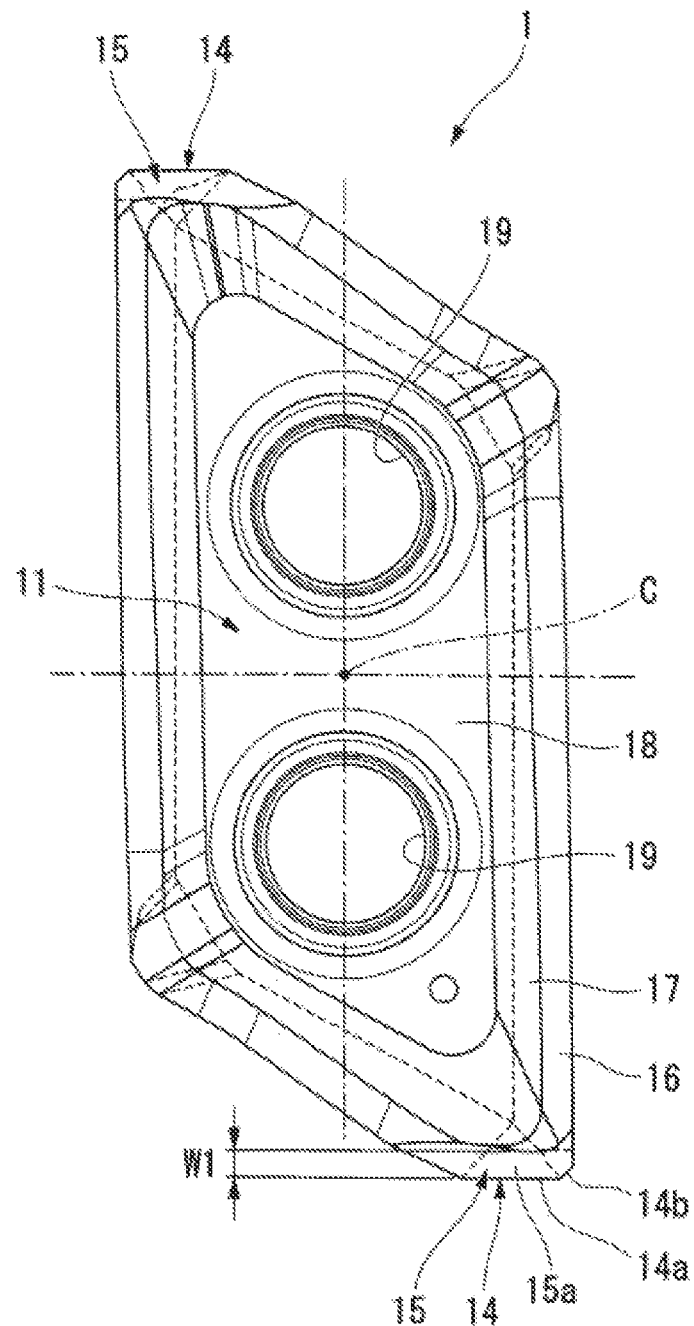
FIG. 7 a plan view (front view) of the cutting insert as viewed from the insert axis direction.

As shown in FIG. 4 to FIG. 6, the corner cutting edge part 14b is linear or convexly curved. In the present implementation, the corner cutting edge part 14b is linear. The corner cutting edge part 14b is connected with the end portion in the cutting edge length direction of the main cutting edge part 14a, and extends in a direction different from the cutting edge length direction of the main cutting edge part 14a. The cutting edge length of the corner cutting edge part 14b is shorter than the cutting edge length of the main cutting edge part 14a.

As shown in FIG. 4 and FIG. 5, when the cutting insert 1 is attached to the tool holder 2, the corner cutting edge part 14b is connected with the outside end portion in the holder diameter direction, out of both end portions in the cutting edge length direction of the main cutting edge part 14a, and extends to the rear end side in the holder axis direction as the corner cutting edge part 14b extends from the above-mentioned outside end portion toward the outside in the holder diameter direction. Moreover, the corner cutting edge part 14b extends to the holder rotation direction T as the corner cutting edge part 14b extends from the above-mentioned outside end portion toward the rear end side in the holder axis direction.

[Front Surface]

When the cutting insert 1 is attached to the tool holder 2, the front surface 11 faces the holder rotation direction T. As shown in FIG. 6 to FIG. 9, the front surface 11 may be polygonal. In the present implementation, the front surface 11 is approximately quadrangle, and specifically, is approximately parallelogram or approximately rectangular. The four sides forming the outer peripheral edge of the front surface 11 include the pair of long sides and the pair of short sides.

The front surface 11 has at least one rake face 15, at least one first inclined surface part 16, a second inclined surface part 17 and a flat surface part 18.

The rake face 15 forms at least a part of the peripheral edge part of the front surface 11. The rake face 15 is adjacent to the cutting edge 14 and disposed on the inside of the cutting edge 14 in the insert diameter direction. The rake face 15 is connected with the cutting edge 14. In the present implementation, the multiple rake faces 15 are formed on (the peripheral edge part of) the front surface 11. The multiple rake faces 15 are disposed with intervals in the insert circumferential direction. In the present implementation, each rake face 15 extends along a part of the short side out of the outer peripheral edge of the front surface 11, as viewed from the insert axis direction.

Figure 8:
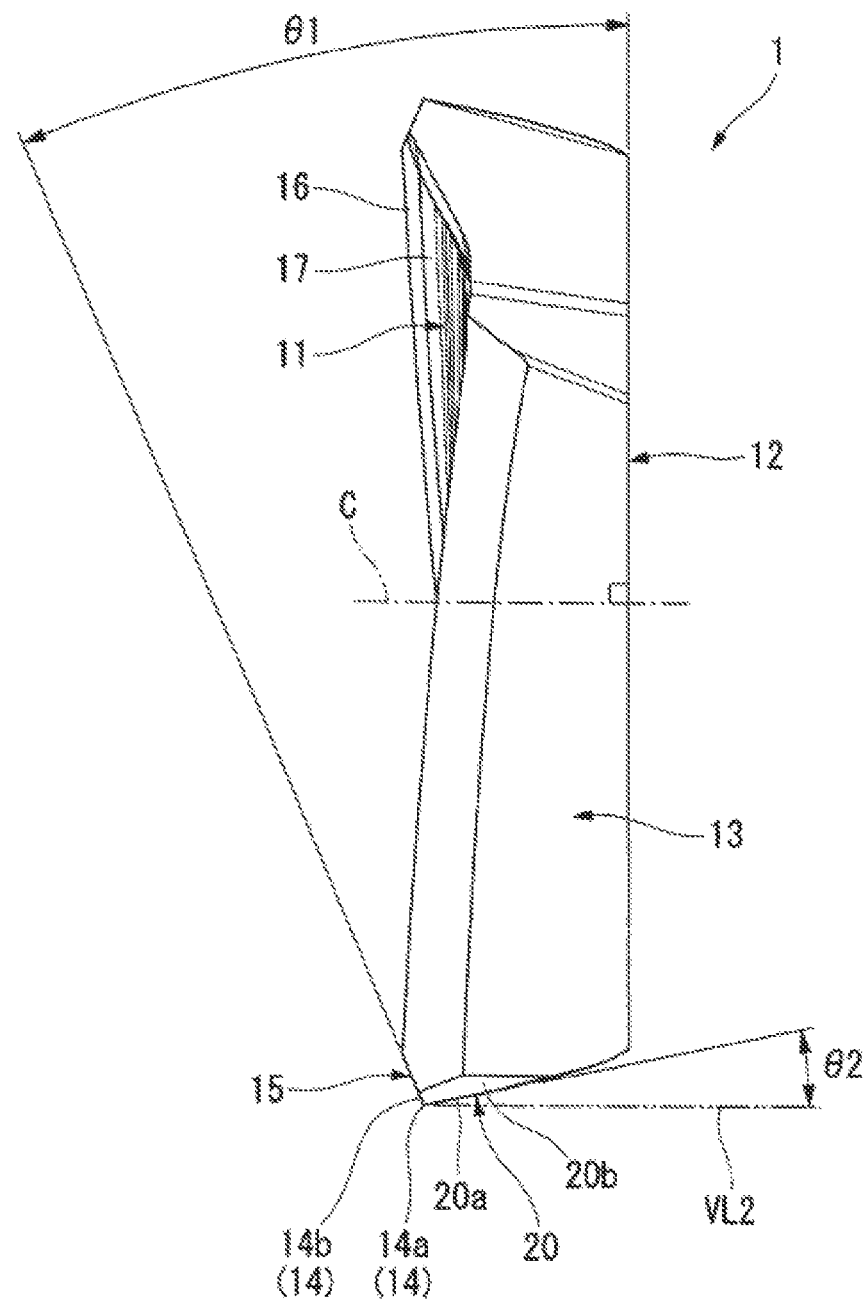
FIG. 8 is a side view of the cutting insert as viewed from the cutting edge length direction of the main cutting edge part.

In FIG. 8, the rake face 15 extends while being inclined from the back surface 12 side to the front surface 11 side in the insert axis direction as the rake face 15 extends from the cutting edge 14 toward the inside in the insert diameter direction. As shown in FIG. 8, the first angle θ1 formed between the back surface 12 and the rake face 15 is larger than 0° as viewed from the cutting edge length direction of the main cutting edge part 14a. The first angle θ1 is preferably not less than 4°, and is more desirably not less than 5°. Moreover, the first angle θ1 is not more than 40°. The first angle θ1 is preferably not more than 17°.

In FIG. 7, the rake face 15 has a rake part 15a.

The rake part 15a forms a part of the rake face 15, and is located between both ends of the main cutting edge part 14a in the cutting edge length direction of the main cutting edge part 14a. As shown in FIG. 7, the first width W1 of the rake part 15a, in the direction orthogonal to the main cutting edge part 14a, as viewed from the insert axis direction is not less than 0.3 mm.

In FIG. 5, when the cutting insert 1 is attached to the tool holder 2, the rake face 15 extends while being inclined in the holder rotation direction T as the rake face 15 extends from the cutting edge 14 toward the rear end side in the holder axis direction. That is, the rake face 15 is a negative inclined surface of which the axial rake angle is negative. As shown in FIG. 5, the third angle θ3 formed between the holder center axis O and the rake face 15 is larger than 0° and not more than 30° as viewed from the cutting edge length direction of the main cutting edge part 14a. Note that, the third angle θ3 may be referred to as the axial rake angle of the main cutting edge part 14a. The axial rake angle of the main cutting edge part 14a is smaller than 0° (that is, negative) and is not less than −30°.

In FIG. 4, the sign VP indicates a virtual plane perpendicular to the holder center axis O. As shown in FIG. 4, the second width W2 of the rake part 15a in the rake face 15 in the holder axis direction is not less than 0.3 mm when the front surface 11 is viewed in the front from the holder circumferential direction.

As shown in FIG. 6 to FIG. 9, the first inclined surface part 16 forms at least a part of the peripheral edge part of the front surface 11. The first inclined surface part 16 extends along the long side and a part of the short side out of the outer peripheral edge of the front surface 11, as viewed from the insert axis direction. The first inclined surface part 16 extends while being inclined from the front surface 11 side to the back surface 12 side in the insert axis direction as the first inclined surface part 16 extends from the outer peripheral edge of the front surface 11 toward the inner side in the insert diameter direction. Note that, the first inclined surface part 16 may have a rake face connected with the cutting edge. In this case, the foregoing rake face is a second rake face which is different from the above-mentioned rake face 15 (i.e., the first rake face 15). The second rake face is a positive inclined surface.

The second inclined surface part 17 is located inside the first inclined surface part 16 or the first inclined surface parts 16 on the front surface 11. The second inclined surface part 17 is connected with the first inclined surface part 16 or the first inclined surface parts 16 from the inner side in the insert diameter direction. The second inclined surface part 17 extends along the first inclined surface part 16 or the first inclined surface parts 16. The second inclined surface part 17 extends while being inclined from the front surface 11 side to the back surface 12 side in the insert axis direction as the second inclined surface part 17 extends from the part connected with the first inclined surface part 16 or the first inclined surface parts 16 toward the inner side in the insert diameter direction.

As shown in FIG. 9, the inclined angle of the second inclined surface part 17 to the back surface 12 is larger than the inclined angle of the first inclined surface part 16 to the back surface 12.

As shown in FIG. 6 and FIG. 7, the flat surface part 18 is located inside the second inclined surface part 17 on the front surface 11. The flat surface part 18 has a flat shape perpendicular to the insert center axis C. The flat surface part 18 is parallel to the back surface 12. The flat surface part 18 may be polygonal. In the present implementation, the flat surface part 18 is approximately quadrangle, and specifically, is approximately parallelogram or approximately rectangular.

[Back Surface]

The back surface 12 lies on a plane perpendicular to the insert center axis C. The back surface 12 is polygonal. In the present implementation, the back surface 12 is approximately quadrangle, and specifically, is approximately parallelogram or approximately rectangular. As shown in FIG. 2 and FIG. 3, when the cutting insert 1 is mounted on the tool holder 2, the back surface 12 faces the direction opposite to the holder rotation direction T. The back surface 12 contacts with the mounting face 4b of the insert mounting seat 4.

[Outer Peripheral Surface]

As shown in FIG. 6 to FIG. 9, the outer peripheral surface 13 faces the outside in the insert diameter direction. The outer peripheral surface 13 extends while being inclined on the inner side in the insert diameter direction as the outer peripheral surface 13 extends from the front surface 11 side to the back surface 12 side in the insert axis direction. That is, the outer peripheral surface 13 consists of positive inclined faces.

The outer peripheral surface 13 has at least one flank 20.

The flank 20 forms at least a part of the outer peripheral surface 13. The flank 20 is disposed adjacently to the cutting edge 14. The flank 20 is connected with the cutting edge 14. The flank 20 extends while being inclined on the inner side in the insert diameter direction as the flank 20 extends from the front surface 11 side to the back surface 12 side in the insert axis direction. As shown in FIG. 8, the inclined angle of the portion of the outer peripheral surface 13, which is closer to the back surface 12 in the insert axis direction than the flank 20, to the insert center axis C is larger than the inclined angle (which is the after-mentioned second angle θ2) of the flank 20 to the insert center axis C. In the present implementation, the multiple flanks 20 are formed on the outer peripheral surface 13. The multiple flanks 20 are disposed with intervals in the insertion circumferential direction.

The number of the flanks 20 formed on the cutting insert 1 is the same as the number of the rake faces 15 formed on the cutting insert 1, and the number is two in the present implementation.

The flank 20 has the first flank part 20a and the second flank part 20b.

The first flank part 20a is disposed adjacently to the main cutting edge part 14a. The first flank part 20a is connected with the main cutting edge part 14a. The first flank part 20a is flat. The first flank part 20a extends while being inclined on the inner side in the insert diameter direction as the first flank part 20a extends from the front surface 11 side to the back surface 12 side in the insert axis direction.

The second flank part 20b is disposed adjacently to the corner cutting edge part 14b. The second flank part 20b is connected with the corner cutting edge part 14b. The second flank part 20b is flat or convexly curved. In the present implementation, the corner cutting edge part 14b is linear, and therefore the second flank part 20b is flat. When the corner cutting edge part 14b is convexly curved, the second flank part 20b is also convexly curved. The second flank part 20b extends while being inclined on the inner side in the insert diameter direction as the second flank part 20b extends from the front surface 11 side to the back surface 12 side in the insert axis direction.

As shown in FIG. 8, the second angle θ2 formed between the flank 20 (the first flank part 20a) and a virtual straight line VL2 which is parallel to the insert center axis C and passes through the main cutting edge part 14a, as viewed from the cutting edge length direction of the main cutting edge part 14a, can be referred to as the second angle θ2 formed between the insert center axis C and the flank 20. The second angle θ2 is larger than 0°. The second angle θ2 is preferably not less than 2.5°, and more desirably, not less than 3.5°.

As shown in FIG. 5, when the cutting insert 1 is mounted on the tool holder 2, the fourth angle θ4 formed between the flank 20 (the first flank part 20a) and a virtual plane VP perpendicular to the holder center axis O becomes not less than 3° as viewed from the cutting edge length direction of the main cutting edge part 14a. Moreover, the fourth angle θ4 is not more than 20°. The fourth angle θ4 is preferably not more than 6°.

[Through Hole]

As shown in FIG. 6 and FIG. 7, each of the through holes 19 passes through the cutting insert 1 in the insert axis direction. Each of the through holes 19 extends inside the cutting insert 1 in the insert axis direction, and opens out on the front surface 11 and the back surface 12. Each of the through holes 19 has a circular cross section perpendicular to the insert center axis C. The multiple through holes 19 are formed in the cutting insert 1. As shown in FIG. 7, the multiple through holes 19 are aligned along each long side out of the four sides (consisting of a pair of the long sides and a pair of the short sides) constituting the outer peripheral edge of the front surface 11, as viewed from the insert axis direction.

[Screw Member]

As shown in FIG. 1, the screw members 3 detachably fix the cutting insert 1 with the insert mounting seat 4 of the tool holder 2. The screw members 3 are inserted into the through holes 19 of the cutting insert 1, and are screwed into the screw holes 4d of the insert mounting seat 4 respectively.

Each of the screw members 3 has a screw shaft and a screw head 3a.

The screw shaft is inserted into the through hole 19 and the screw hole 4d. The screw shaft has an external thread. The external thread of the screw shaft is screwed to the internal thread of the screw hole 4d.

The screw head 3a is coupled to the end part of the screw shaft. The outer diameter of the screw head 3a is larger than the outer diameter of the screw shaft. At least a part of the screw head 3a is inserted into the through hole 19. The screw head 3a comes into contact with the tapered portion of the opening forming the through hole 19.

[Rotary Cutting Method]

Next, a rotary cutting method for rotary cutting of a workpiece using a rotary tool typified by the above-mentioned tip replaceable rotary tool 10 will be described.

For example, the workpiece W is made of an aluminum alloy, and is an elongated member of several meters (e.g., not less than 3 m) having a plate-like portion of which plate thickness is several millimeters (e.g., about 2 mm), as shown in FIG. 10. The workpiece W is fixed to a stage S of a machine tool. One plate surface (the lower surface) out of a pair of the plate surfaces of the plate-like portion of the workpiece W comes into contact with a supporting face of the stage S of the machine tool while the other plate surface (the upper surface) is subjected to rotary cutting by a rotary tool, such as the above-mentioned tip replaceable rotary tool 10. The rotary cutting method according to the present implementation is a method for rotary cutting of at least a plate surface (a surface to be processed) of the plate-like portion of the workpiece W, and is suitable for finishing in particular. The rotary cutting method according to the present implementation is also suitable for rotary cutting and ramping cutting of a pocket part of a workpiece.

Figure 11:
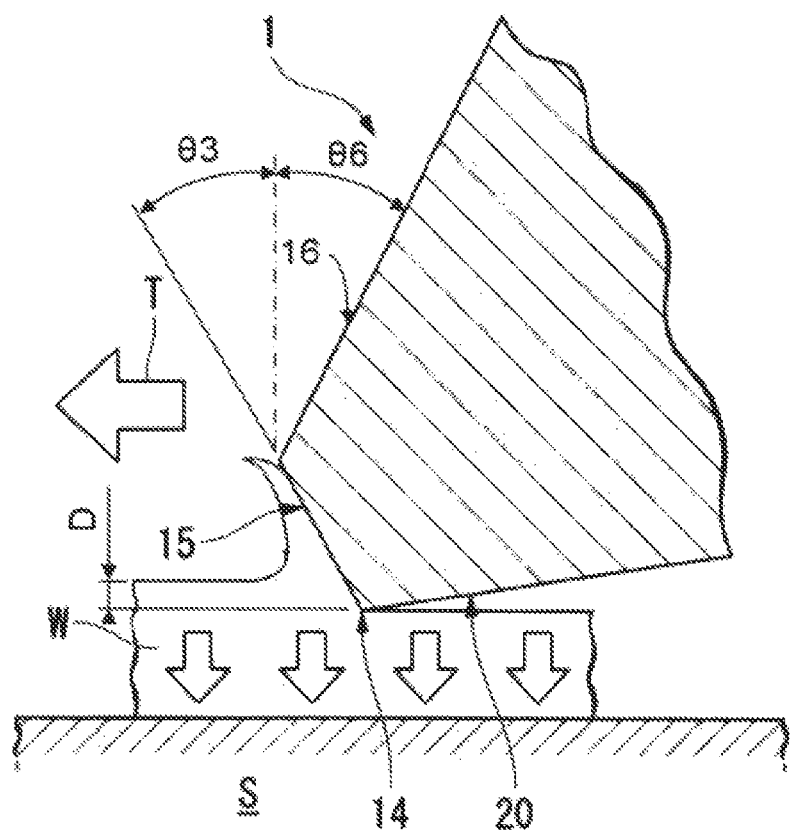
FIG. 11 is an enlarged view of a vicinity of the cutting edge for explaining the rotary cutting method according to an implementation of the present invention.

In case of rotary cutting by the tip replaceable rotary tool 10, the workpiece W is machined with the rotating cutting edges 14 by placing the tip part of the tool holder 2 to face the workpiece W from the holder axis direction, and rotating the tool holder 2 in the holder rotation direction T as shown in FIG. 10. At this time, component force toward the tip side in the holder axis direction (i.e., component force opposite to the thrust force) is applied to the workpiece W while the rotary cutting as shown in FIG. 11.

Specifically, the tip replaceable rotary tool 10 has the at least one cutting edge 14 having the negative fifth angle θ5, which is the rake angle in the rotation radial direction, and the negative third angle θ3, which is the rake angle in the rotation axis direction. As a concrete example, the rake angle in the rotation axis direction of the rotary tool, i.e., the third angle θ3 is larger than 0° and not more than 30°.

Therefore, when not only the tip replaceable rotary tool 10 having the tool holder 2 to which the cutting inserts 1 have been attached, but a tip non-replaceable rotary tool whose cutting edges integrated with a shank each has the same shape as that of the cutting edge 14 of the tip replaceable rotary tool 10 is used for rotary cutting of the workpiece W, compressive residual stress toward the tip side in the holder axis direction can be given to the workpiece W.

When the workpiece W is made of an aluminum alloy, an appropriate cutting condition in rotary cutting is to make the feeding amount per one cutting edge not less than 0.2 mm and not more than 1.0 mm, from a viewpoint of the reduction in welding of the aluminum alloy caused by generation of processing heat.

Moreover, when the workpiece W made of an aluminum alloy is finished by rotary cutting with making the cutting amount D not less than 0.1 mm and not more than 1.1 mm, compressive residual stress can be given to a surface of the workpiece W. That is, compressive residual stress can be given to a surface of a processed product produced by the rotary cutting of the workpiece W.

As a result, compressive residual stress can be given to a surface of a processed product not only for reduction in the warpage of the processed product, but for improvement of mechanical strength of the processed product, such as fatigue strength, wear resistance and/or stress corrosion cracking resistance. That is, compressive residual stress can be given to a surface of a processed product for at least one of the reduction in the warpage of the processed product and the improvement of mechanical strength of the processed product.

Experientially, it is considered that giving compressive residual stress of not less than 100 MPa to a range of not more than 0.2 mm in depth from the surface can attain the effect of improvement in mechanical strength to a practical extent. In particular, optimizing cutting conditions also makes it possible to give, to a surface of a processed product, compressive residual stress equivalent to that given by shot peening. In that case, it also becomes possible to omit conventional shot peening process after rotary cutting process.

Note that, it has been confirmed that there was an actual example that compressive residual stress of about 200 MPa to 300 MPa, which was much larger than 100 MPa, was given to an aluminum alloy by rotary cutting of the aluminum alloy with the tip replaceable rotary tool 10.

Figure 12:
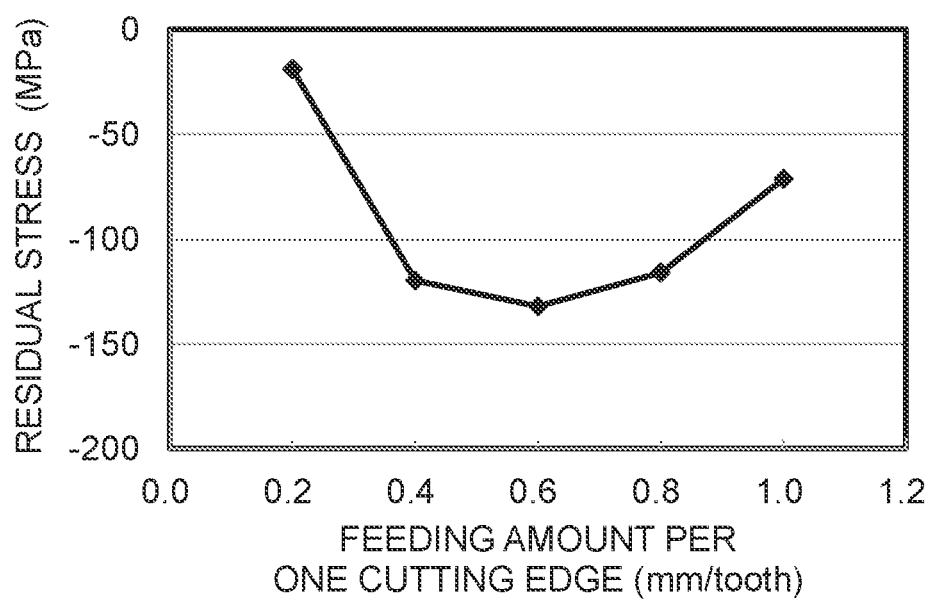
FIG. 12 shows a relationship between the feeding amount per one cutting edge and compressive residual stress given to a workpiece by rotary cutting of the workpiece with the tip replaceable rotary tool as shown in FIG. 10.

FIG. 12 shows a relationship between the feeding amount per one cutting edge and compressive residual stress given to a workpiece W by rotary cutting of the workpiece W with the tip replaceable rotary tool 10 as shown in FIG. 10.

In FIG. 12, the horizontal axis denotes the feeding amount (mm) per one cutting edge of the tip replaceable rotary tool 10 while the vertical axis denotes the residual stress (MPa) given to the workpiece W made of an aluminum alloy by rotary cutting of the workpiece W with the tip replaceable rotary tool 10 whose tool diameter is 25 mm when the cutting amount D in the tool axis direction is 0.5 mm. Note that, the residual stress is represented by the measured values at a position of 0.10 mm in depth from the surface of the workpiece W after the rotary cutting, and was measured by a commercially available X-ray residual stress measuring apparatus.

According to the measurement result of the residual stress shown in FIG. 12, it is understood that the feeding amount per one cutting edge of the tip replaceable rotary tool 10 within a range of not less than 0.2 mm and not more than 1.0 mm allows giving compressive residual stress to the workpiece W since the measured values of the residual stress each becomes negative as long as material of the workpiece W is an aluminum alloy. In addition, it is understood that compressive residual stress given to the workpiece W becomes the maximum when the feeding amount per one cutting edge is within the range of not less than 0.2 mm and not more than 1.0 mm, and that the feeding amount per one cutting edge of not less than 0.4 mm and not more than 0.8 mm allows stably giving the compressive residual stress to the workpiece W.

Figure 13:
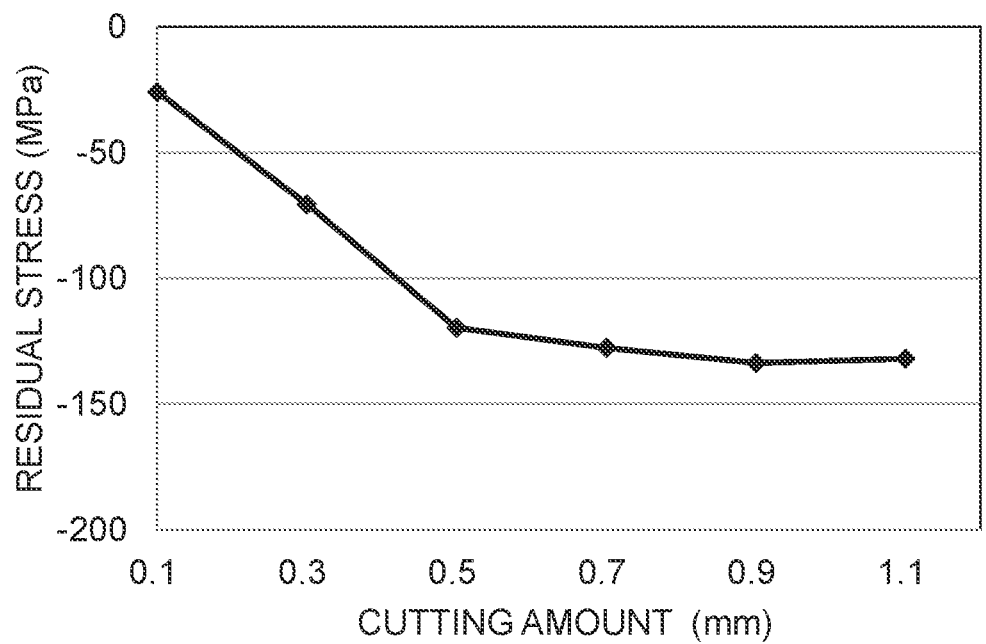
FIG. 13 shows a relationship between the cutting amount and compressive residual stress given to a workpiece by rotary cutting of the workpiece with the tip replaceable rotary tool as shown in FIG. 10.

FIG. 13 shows a relationship between the cutting amount D and compressive residual stress given to a workpiece W by rotary cutting of the workpiece W with the tip replaceable rotary tool 10 as shown in FIG. 10.

In FIG. 13, the horizontal axis denotes the cutting amount D (mm) in the tool axis direction of the tip replaceable rotary tool 10 to the workpiece W made of an aluminum alloy for rotary cutting of the workpiece W with the feeding amount per one cutting edge of 0.4 mm and the tool diameter of the tip replaceable rotary tool 10 of 25 mm. Meanwhile, the vertical axis denotes the residual stress (MPa) given to the workpiece W after the rotary cutting of the workpiece W with the tip replaceable rotary tool 10. Note that, the residual stress is represented by the measured values at a position of 0.10 mm in depth from the surface of the workpiece W after the rotary cutting, and was measured by a commercially available X-ray residual stress measuring apparatus.

According to the measurement result of the residual stress shown in FIG. 13, it is understood that the cutting amount D in the tool axis direction of the tip replaceable rotary tool 10 to the workpiece W within a range of not less than 0.1 mm and not more than 1.1 mm allows giving compressive residual stress to the workpiece W since the measured values of the residual stress each becomes negative as long as material of the workpiece W is an aluminum alloy. In addition, it is understood that the cutting amount D in the tool axis direction of the tip replaceable rotary tool 10 to the workpiece W of not less than 0.5 mm and not more than 1.1 mm allows stably giving the compressive residual stress to the workpiece W.

Besides the above-mentioned rotary cutting conditions including the feeding amount per one cutting edge and the cutting amount D, the relief angle formed as the fourth angle θ4 of a rotary tool of not less than 3° and not more than 20° allows giving component force in the compressive direction to the workpiece W more stably since a part of the flank 20 works so as to press a surface to be processed of the workpiece W.

When the conventional rotary tool having a negative rake angle is used for rotary cutting of the workpiece W made of a viscous aluminum alloy, there is a problem that chips of the aluminum alloy are not divided but welded to the rotary tool.

On the contrary, the tip replaceable rotary tool 10 has the positive sixth angle θ6 of the first inclined surface part 16 and the second inclined surface part 17 from the rotation axis direction as shown in FIG. 11, and the first inclined surface part 16 forming a inclined surface facing the rotation direction of the tip replaceable rotary tool 10 is connected at the ridgeline with the rake face 15 forming the rake angles in the rotation radial direction and the rotation axis direction. In other words, the tip replaceable rotary tool 10 has not only the negative third angle θ3 which is the local first rake angle in the tip portion in the rotation axis direction, but the comprehensive positive second rake angle formed as the sixth angle θ6 in the portion other than the tip portion by the first inclined surface part 16.

Accordingly, when the tip replaceable rotary tool 10 is used for rotary cutting, chips of an aluminum alloy can be divided so that welding of the aluminum alloy can be reduced, similarly to a case of using a rotary tool of which rake angle is positive, although the rake angle of the tip replaceable rotary tool 10 is negative. That is, both of giving compressive residual stress and preventing welding of an aluminum alloy can be achieved by making the rake angle of each cutting edge negative locally but positive in a broader perspective. This is similar in rotary cutting using a rotary tool having cutting edges similar to the cutting edges 14 of the tip replaceable rotary tool 10.

In addition, cooling by coolant supplied from the coolant holes 6 during rotary cutting can reduce the welding of an aluminum alloy more effectively. Therefore, the cooling by the coolant during rotary cutting with a rotary tool, such as the tip replaceable rotary tool 10, is desirable for preventing the welding of an aluminum alloy.

Moreover, at least one cutting edge whose rake angle in the rotation axis direction is positive may be attached to or formed on a rotary tool, such as the tip replaceable rotary tool 10, in addition to the cutting edges 14 whose rake angles in the rotation axis direction are each negative. That is, a rotary tool having both of at least one cutting edge whose rake angle is negative and at least one cutting edge whose rake angle is positive may be used for rotary cutting of the workpiece W. In that case, both merits of at least one cutting edge whose rake angle is negative and at least one cutting edge whose rake angle is positive can be utilized in rotary cutting.

[Operational Effects by the Present Implementation]

Firstly, operational effects of the cutting insert 1 will be described.

The cutting insert 1 in the present implementation has the outer peripheral surface 13, on which the flanks 20 are formed, consisting of positive inclined surfaces located inward in the insert diameter direction as each positive inclined surface extends from the front surface 11 side to the back surface 12 side in the insert axis direction. Moreover, the rake face 15 consists of a negative inclined surface extending from the back surface 12 side to the front surface 11 side in the insert axis direction as the negative inclined surface extends from the cutting edge 14 toward the inner side in the insert diameter direction.

Figure 14:
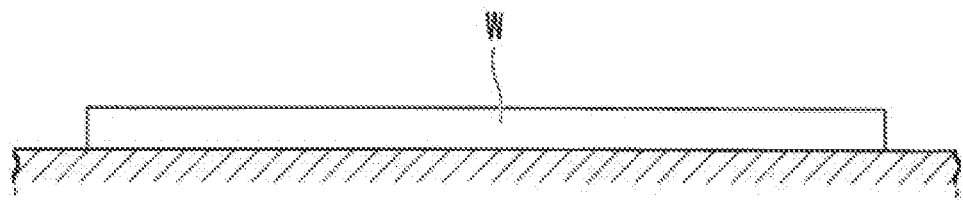
FIG. 14 explains a warpage amount of a workpiece after the rotary cutting by the rotary cutting method according to an implementation of the present invention.

According to the cutting insert 1 in the present implementation, component force (opposite to the thrust force) in the compressive direction can be applied to the workpiece W during rotary cutting so that the workpiece W may be pressed to the stage S of the machine tool supporting the workpiece W, as shown in FIG. 11. That is, the workpiece W can be pressed by sandwiching the workpiece W between the cutting inserts 1 and the stage S during rotary cutting. Thereby, deflection and warpage of the workpiece W after the rotary cutting can be suppressed as shown in FIG. 14.

In more detail, the workpiece W generally has distributions of residual stress (consisting of the tensile residual stress and the compressive residual stress) different among parts in the plate thickness direction, as characteristic of material (before rotary cutting), and the balance of the distributions of the residual stress changes due to rotary cutting of the workpiece W. Therefore, moment of force has been conventionally generated in the workpiece W due to rotary cutting, and thereby warpage has arisen. Meanwhile, in the present implementation, the balance of the residual stress distributions in the workpiece W can be prevented from changing, and thereby moment of force can be also prevented from being generated since compressive residual stress is given to the workpiece W during rotary cutting. As a result, warpage of the workpiece W can be suppressed.

In particular, even in case of rotary cutting of a plate-like portion whose plate thickness is about several millimeters, of the workpieces W, such as an elongated wing surface part of an aircraft whose length is about several meters, or the like, warpage possibly generated in the workpiece W can be remarkably suppressed, and thereby processing quality can be improved. Consequently, time and effort for various processes to correct the warpage of the workpiece W after rotary cutting can be suppressed, the manufacturing cost can be reduced, and the productivity can be improved.

In order to make it easier to understand the operational effects by the present implementation, a reference example different from the present implementation will be described with reference to FIG. 15 and FIG. 16.

Figure 15:
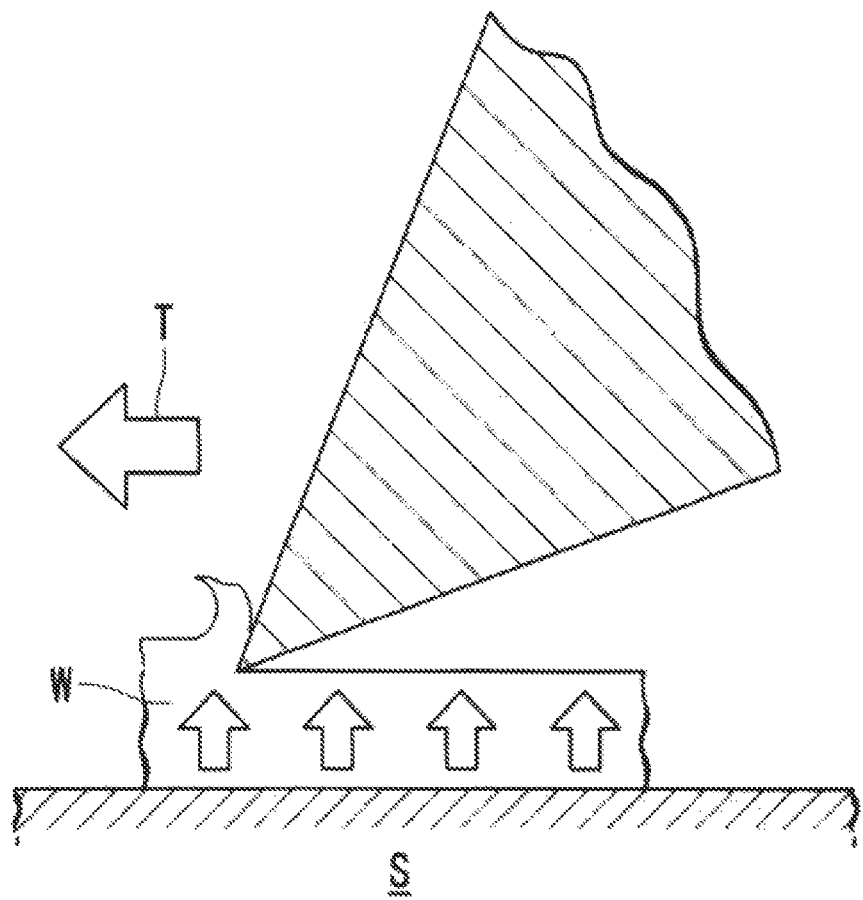
FIG. 15 is an enlarged view of a vicinity of a cutting edge for explaining a rotary cutting method in a reference example.
Figure 16:
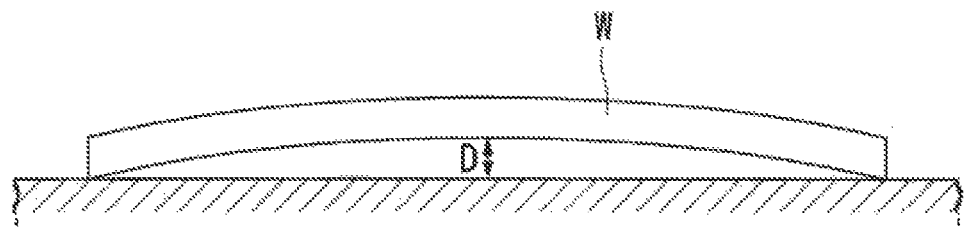
FIG. 16 explains a warpage amount of a workpiece after rotary cutting by the rotary cutting method in the reference example.

FIG. 15 is an enlarged view showing a vicinity of a cutting edge of a cutting insert mounted on a tip replaceable rotary tool in the reference example during rotary cutting. In this cutting insert, the rake face of the cutting edge inclines in the opposite direction to the holder rotation direction T as the rake face of the cutting edge extends on the rear end side in the holder axis direction. That is, the rake angle of the cutting edge is positive.

When this cutting insert is used for rotary cutting of the workpiece W, the workpiece W cannot be pressed to the stage S of the machine tool, which means that compressive residual stress cannot be given to the workpiece W during the rotary cutting, and therefore the balance of the residual stress distributions in the workpiece W changes easily. Accordingly, moment of force is generated in the workpiece W, and thereby deflection and warpage arise in the workpiece W after the rotary cutting, as shown in FIG. 16. For example, the warped amount D is about 1 mm. Since the workpiece W with the warpage cannot be assembled as a wing surface part of an aircraft, various processes to correct the warpage are required.

According to the present implementation, various processes to correct such warpage can be reduced.

Moreover, the cutting insert 1 in the present implementation has the first angle θ1, by which the rake face 15 inclines to the back surface 12 perpendicular to the insert center axis C, of not less than 4° as viewed from the cutting edge length direction of the main cutting edge part 14a. Therefore, the rake angle of the main cutting edge part 14a becomes negative stably regardless of the attaching angle of the cutting insert 1 to the tool holder 2 so that component force in the compressive direction can be easily applied to the workpiece W, and thereby the function to suppress the above-mentioned warpage in the workpiece W becomes more stable. Note that, the first angle θ1 is more preferably not less than 5°.

Moreover, the second angle θ2 by which the flank 20 inclines to the insert center axis C is not less than 2.5° as viewed from the cutting edge length direction of the main cutting edge part 14a. Thereby, the relief angle of the main cutting edge part 14a can be easily secured stably regardless of the attaching angle of the cutting insert 1 to the tool holder 2. Note that, the second angle θ2 is more preferably not less than 3.5°.

Moreover, the cutting insert 1 in the present implementation has the first angle θ1 of not more than 40°.

When the first angle θ1 by which the rake face 15 inclines to the back surface 12 is not more than 40° as viewed from the cutting edge length direction of the main cutting edge part 14a, the sharpness of the main cutting edge part 14a can be kept satisfactory while the above-mentioned operational effects can be obtained. Note that, the first angle θ1 is more preferably not more than 17°.

Moreover, the cutting insert 1 in the present implementation has the first width W1 of not less than 0.3 mm.

When the first width W1 of the rake part 15a, adjacent to the main cutting edge part 14a, on the rake face 15 is not less than 0.3 mm as viewed from the insert axis direction, component force in the compressive direction can be easily applied to a workpiece by the rake part 15a stably regardless of the cutting amount (depth) in rotary cutting with the main cutting edge part 14a. Note that, the first width W1 is more preferably not less than 0.7 mm.

Moreover, the cutting insert 1 in the present implementation includes the cutting edge 14 having the main cutting edge part 14a and the corner cutting edge part 14b.

In this case, chipping and the like of the main cutting edge part 14a can be suppressed by cutting into a workpiece from the corner cutting edge part 14b in rotary cutting, and thereby the cutting accuracy by the main cutting edge part 14a becomes stable and is secured.

Next, operational effects of the tip replaceable rotary tool 10 will be described.

The tip replaceable rotary tool 10 in the present implementation has the rake face 15 of the cutting insert 1 consisting of a negative inclined surface located in the holder rotation direction T as the negative inclined surface extends toward the rear end side in the holder axis direction. That is, the axial rake angle of the cutting edge 14 is negative.

According to the tip replaceable rotary tool 10 in the present implementation, component force (opposite to the thrust force) in the compressive direction can be applied to the workpiece W during rotary cutting so that the workpiece W may be pressed to the stage S of the machine tool which supports the workpiece W, as shown in FIG. 11. That is, the workpiece W can be pressed by sandwiching the workpiece W between the tip replaceable rotary tool 10 and the stage S during rotary cutting. Thereby, deflection and warpage of the workpiece W after rotary cutting can be suppressed as shown in FIG. 14. Specifically, in the present implementation, the balance of the residual stress distributions in the workpiece W can be prevented from changing by giving compressive residual stress to the workpiece W during rotary cutting, and thereby moment of force can be prevented from being generated. Accordingly, warpage of the workpiece W can be suppressed. In particular, even in case of rotary cutting of the plate-like portion whose plate thickness is about several millimeters, or the like of the workpieces W, such as an elongated wing surface part of an aircraft whose length is about several meters, warpage possibly generated in the workpiece W can be remarkably suppressed and the processing quality can be improved. Consequently, time and effort for various processes to correct warpage of the workpiece W after rotary cutting can be suppressed, and thereby the manufacturing cost can be reduced while the productivity can be improved.

Moreover, the mounting face 4b of the insert mounting seat 4 consists of a positive inclined surface located in the direction opposite to the holder rotation direction T as the positive inclined surface extends toward the rear end side in the holder axis direction. Therefore, the axial rake angle of the portion other than the rake face 15 on the front surface 11 of the cutting insert 1 can be made positive, and thereby chip discharging property can be improved. Moreover, it becomes easy to secure the large capacity of the chip pocket 5, and chip processing is stabilized more.

Moreover, it is suppressed that the mounting face 4b presses the workpiece W too much through the cutting insert 1 since the mounting face 4b consists of an inclined surface whose angle is positive. Thereby, the processed surface accuracy of the workpiece W is kept satisfactory.

Moreover, the tip replaceable rotary tool 10 in the present implementation has the third angle θ3 of not more than 30°.

The structure that the third angle θ3 by which the rake face 15 consisting of a negative inclined surface inclines to the holder center axis O is not more than 30° as viewed from the cutting edge length direction of the main cutting edge part 14a is same as the structure that the axial rake angle of the main cutting edge part 14a is negative and not less than −30°. In this case, the sharpness of the main cutting edge part 14a can be kept satisfactory while the above-mentioned operational effects can be obtained.

Moreover, the tip replaceable rotary tool 10 in the present implementation has the main cutting edge part 14a located in the direction opposite to the holder rotation direction T as the main cutting edge part 14a extends outside in the holder diameter direction, as viewed from the holder axis direction. That is, the radial rake angle of the main cutting edge part 14a is negative. Therefore, it is easy to stably apply component force in the compressive direction to the workpiece W.

The structure that the fifth angle θ5, by which the main cutting edge part 14a inclines to the virtual straight line VL1 passing through the holder center axis O and the outer end of the main cutting edge part 14a in the holder diameter direction, is not less than 12° as viewed from the holder axis direction as shown in FIG. 3 is same as the structure that the radial rake angle of the main cutting edge part 14a is negative and not more than −12°. In this case, component force in the compressive direction can be applied to the workpiece W more stably during rotary cutting.

Moreover, the structure that the fifth angle θ5 is not more than 30° as viewed from the holder axis direction is same as the structure that the radial rake angle of the main cutting edge part 14a is negative and not less than −30°. In this case, the sharpness of the main cutting edge part 14a, the rigidity of the cutting insert 1 and easiness of producing the cutting insert 1 can be kept satisfactory while the above-mentioned operational effects can be obtained.

Moreover, the tip replaceable rotary tool 10 in the present implementation has the fourth angle θ4 of not less than 3°.

When the fourth angle θ4 (i.e., the relief angle) by which the flank 20 inclines to the virtual plane VP is not less than 3° as viewed from the cutting edge length direction of the main cutting edge part 14a, cutting resistance and wear of the flank can be suppressed, and thereby rotary cutting by the main cutting edge part 14a can be stabilized.

Moreover, the tip replaceable rotary tool 10 in the present implementation has the fourth angle θ4 of not more than 20°.

When the fourth angle θ4 by which the flank 20 inclines to the virtual plane VP is not more than 20° as viewed from the cutting edge length direction of the main cutting edge part 14a, a part of the flank 20 acts so as to press a surface to be processed of the workpiece W, and thereby component force in the compressive direction can be easily applied to the workpiece W more stably in rotary cutting. Note that, the fourth angle θ4 is more preferably not more than 6°.

Moreover, the tip replaceable rotary tool 10 in the present implementation has the second width W2 of not less than 0.3 mm.

When the second width W2 of the rake part 15a, adjacent to the main cutting edge part 14a, on the rake face 15 is not less than 0.3 mm as viewed from the holder circumference direction, component force in the compressive direction can be easily applied to the workpiece W stably regardless of the cutting amount (depth) in the holder axis direction in rotary cutting by the main cutting edge part 14a. Note that, the second width W2 is more preferably not less than 0.7 mm.

Moreover, the tip replaceable rotary tool 10 in the present implementation includes the cutting edge 14 having the main cutting edge part 14a and the corner cutting edge part 14b.

In this case, chipping and the like of the cutting edge 14 can be suppressed by cutting into the workpiece W from the corner cutting edge part 14b by feeding the tool in the holder diameter direction in rotary cutting, and thereby the cutting accuracy by the main cutting edge part 14a is kept satisfactory.

Next, operational effects by the rotary cutting method using the tip replaceable rotary tool 10 or a rotary tool having cutting edges whose shapes are similar to those of the cutting edges 14 of the tip replaceable rotary tool 10 will be described.

According to the rotary cutting method in the present implementation, component force (opposite to the thrust force) in the compressive direction can be applied to the workpiece W so as to press the workpiece W to the stage S of the machine tool supporting the workpiece W during rotary cutting, as shown in FIG. 11. That is, the workpiece W can be pressed by sandwiching the workpiece W between the stage S and a rotary tool, such as the tip replaceable rotary tool 10, during rotary cutting. Thereby, deflection and warpage of the workpiece W after rotary cutting can be suppressed as shown in FIG. 14. Specifically, in the present implementation, the balance of the residual stress distributions in the workpiece W can be prevented from changing by giving compressive residual stress to the workpiece W during rotary cutting, and thereby moment of force can be prevented from being generated. Consequently, warpage of the workpiece W can be suppressed. In particular, even in case of rotary cutting of the plate-like portion whose plate thickness is about several millimeters, or the like of the workpieces W, such as an elongated wing surface part of an aircraft whose length is about several meters, warpage possibly generated in the workpiece W can be remarkably suppressed and processing quality can be improved. As a result, time and effort for various processes to correct warpage of the workpiece W after rotary cutting can be suppressed, and thereby the manufacturing cost can be reduced while the productivity can be improved.

Moreover, when the workpiece W is a rolled material made of an aluminum alloy, there are problems that using a conventional rotary tool having a positive rake angle in order to divide chips to avoid welding causes warpage of the workpiece W after the rotary cutting since the compressive residual stress distribution in the surface layer of the workpiece W greatly changes before and after the rotary cutting while using a conventional rotary tool having a negative rake angle causes welding of an undivided chip due to the cutting heat since the aluminum alloy is viscous.

On the other hand, according to the rotary cutting method using the tip replaceable rotary tool 10 or a rotary tool whose cutting edges having shapes similar to those of the cutting edges 14 of the tip replaceable rotary tool 10, compressive residual stress can be given to the surface of the workpiece W since the rake angle is negative. As a result, not only warp in the workpiece W after rotary cutting can be reduced, but mechanical property, such as fatigue strength, can be improved. In addition, trouble that chips are welded to the rotary tool due to the cutting heat can be also prevented. It is presumed that this is because chips are divided by the cutting edges whose rake angles are positive in broad perspective. That is, at least both of the prevention of warpage and the prevention of welding of chips can be achieved.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, the cutting insert 1 may not be a quadrangular plate. The cutting insert 1 may be a triangular plate or the like, for example. Moreover, the cutting insert 1 may also be a so-called round insert having a disk shape. In this case, the main cutting edge part of the cutting edge is circular around the insert center axis C. Moreover, in this case, "as viewed from the cutting edge length direction of the main cutting edge part" means "as viewed from the direction (the tangential direction) in which a tangent line of the main cutting edge part, passing through a part (the tip portion in the holder axis direction) of the main cutting edge part, extends".

Contrary to the above-mentioned implementation, the main cutting edge part 14a may not be linear. For example, the main cutting edge part 14a may have a convexly curved shape having a large radius of curvature, or the like. In this case, "as viewed from the cutting edge length direction of the main cutting edge part" also means "as viewed from the direction (the tangential direction) in which a tangent line of the main cutting edge part passing through a part of the main cutting edge part extends".

As shown in FIG. 4, the cutting edge 14 may have a side cutting edge part 14c, as a cutting edge part other than the main cutting edge part 14a and the corner cutting edge part 14b, for example. The side cutting edge part 14c extends in the direction substantially orthogonal to the main cutting edge part 14a, and one end of the corner cutting edge part 14b is connected with the main cutting edge part 14a while the other end is connected with the side cutting edge part 14c.

Moreover, the cutting insert 1 and each cutting edge of the rotary tool may be made of not only cemented carbide but another material, such as high-speed steel, ceramics or diamond. Note that, the feeding amount per one cutting edge desirable for giving compressive residual stress to the workpiece W made of an aluminum alloy is not less than 0.2 mm and not more than 1.0 mm, and more preferably, not less than 0.4 mm and not more than 0.8 mm, as shown in FIG. 12, within which value is sufficiently smaller than the maximum permissible value of the feeding amount per one cutting edge corresponding to any material of the cutting insert 1 and the cutting edge of the rotary tool. Therefore, also in a case where material of the cutting insert 1 and the cutting edge of the rotary tool is high-speed steel, ceramics, diamond or the like, it is considered that practically large compressive residual stress can be given to the workpiece W made of an aluminum alloy by making the feeding amount per one cutting edge not less than 0.2 mm and not more than 1.0 mm, and more preferably, not less than 0.4 mm and not more than 0.8 mm.

Similarly, the cutting amount D desirable to give compressive residual stress to the workpiece W made of an aluminum alloy is also a depth suitable for finishing, at which cutting resistance is comparatively small. Therefore, it is considered that the cutting amount D similar to that in the case where material of the cutting insert 1 and the cutting edge of the rotary tool is cemented carbide is an appropriate condition also in a case where material of the cutting insert 1 and the cutting edge of the rotary tool is high-speed steel, ceramics, diamond or the like.

Moreover, although an example of case where the workpiece W was an aluminum alloy was mainly described above, also in case of rotary cutting of the workpiece W made of a titanium alloy, frequently used as material of an aircraft part, or an iron alloy typified by steel, such as stainless steel and corrosion resistant steel, using the tip replaceable rotary tool 10 or a rotary tool whose cutting edges each having a shape similar to that of the cutting edge 14 of the tip replaceable rotary tool 10 can achieve both of reducing warpage and giving compressive residual stress.

When the workpiece W is made of a metal other than an aluminum alloy, moderate compressive residual stress can be given to the workpiece W by rotary cutting of the workpiece W with an appropriate cutting amount D and feeding amount per one cutting edge according to a material of the workpiece W. For example, when the workpiece W is made of a titanium alloy, the feeding amount per one cutting edge in rotary cutting can be made not less than 0.01 mm and not more than 0.3 mm while the cutting amount in the rotary cutting can be made not less than 0.1 mm and not more than 1.1 mm.

Note that, an example that compressive residual stress of 560 MPa much larger than 100 MPa was given to a titanium alloy by rotary cutting of the titanium alloy with the tip replaceable rotary tool 10, and another example that compressive residual stress of 400 MPa much larger than 100 MPa was given to an iron alloy by rotary cutting of the iron alloy with the tip replaceable rotary tool 10, were actually confirmed.

What is claimed is:

1. A rotary cutting method comprising:
   rotating a milling cutter around a rotation axis while engaging the milling cutter with a surface of a workpiece to apply a compressive force to a surface region of the workpiece; and
   plastically deforming the surface region by the compressive force during the rotary cutting to introduce compressive residual stress of not less than 100 MPa into the surface region to improve mechanical strength of a processed product;
   wherein the workpiece is made of an aluminum alloy,
   wherein the milling cutter has at least one cutting edge with:
   a radial rake angle that is not less than −30 degrees and not more than −12 degrees;
   an axial rake angle that is less than 0 degrees and not less than −30 degrees; and
   a relief angle that is not less than 3 degrees and not more than 20 degrees,
   wherein the rotary cutting is performed under cutting conditions of the aluminum alloy including:
   a feeding amount per one cutting edge of the at least one cutting edge that is not less than 0.4 mm and not more than 0.8 mm; and
   a cutting depth per one cutting edge that is not less than 0.5 mm and not more than 1.1 mm, and wherein the compressive residual stress is introduced into the surface region within 0.2 mm from the surface of the workpiece.

2. The rotary cutting method according to claim 1,
wherein the workpiece and the at least one cutting edge are cooled down with coolant during the rotary cutting.

3. A rotary cutting method comprising:
rotating a milling cutter around a rotation axis while engaging the milling cutter with a surface of a workpiece to apply a compressive force to a surface region of the workpiece; and
plastically deforming the surface region by the compressive force during the rotary cutting to introduce compressive residual stress of not less than 100 MPa into the surface region to improve mechanical strength of a processed product;
wherein the workpiece is made of a titanium alloy,
wherein the milling cutter has at least one cutting edge with a radial rake angle that is not less than −30 degrees and not more than −12 degrees;

an axial rake angle that is less than 0 degrees and not less than −30 degrees; and a relief angle that is not less than 3 degrees and not more than 20 degrees, wherein the rotary cutting is performed under cutting conditions of the titanium alloy including:

a feeding amount per one cutting edge of the at least one cutting edge that is not less than 0.01 mm and not more than 0.3 mm; and a cutting depth per one cutting edge that is not less than 0.1 mm and not more than 1.1 mm, and wherein the compressive residual stress is introduced into the surface region within 0.2 mm from the surface of the workpiece.

\* \* \* \* \*